Aug. 7, 1945.  G. H. BUGENHAGEN  2,380,919
CONFORMATOR GAUGE FOR TUBULAR JOINTS
Filed Sept. 9, 1943    2 Sheets-Sheet 2
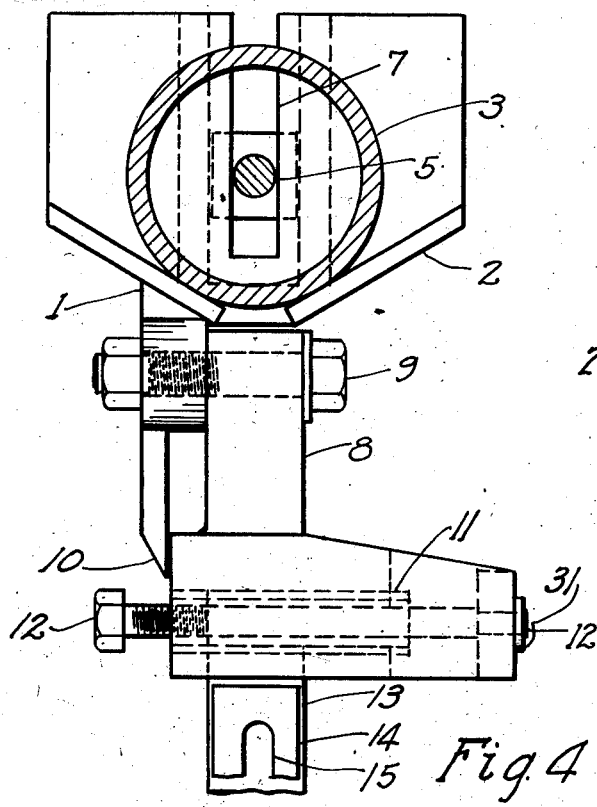
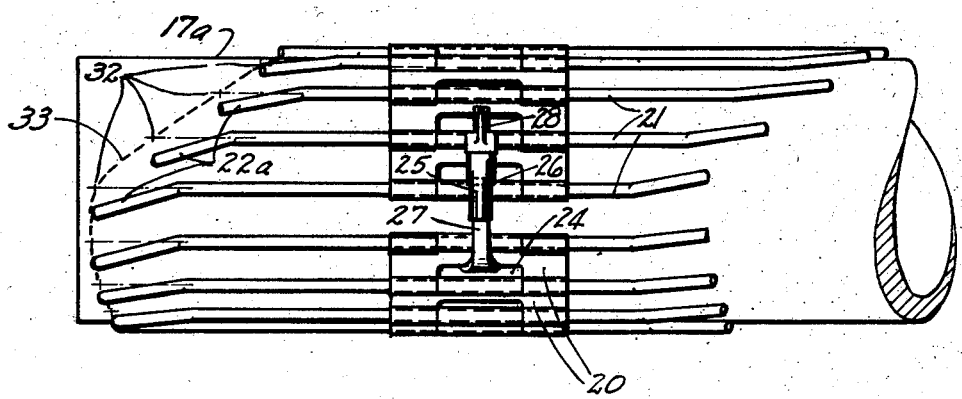
INVENTOR.
Geo. H. Bugenhagen
BY
ATTORNEY.

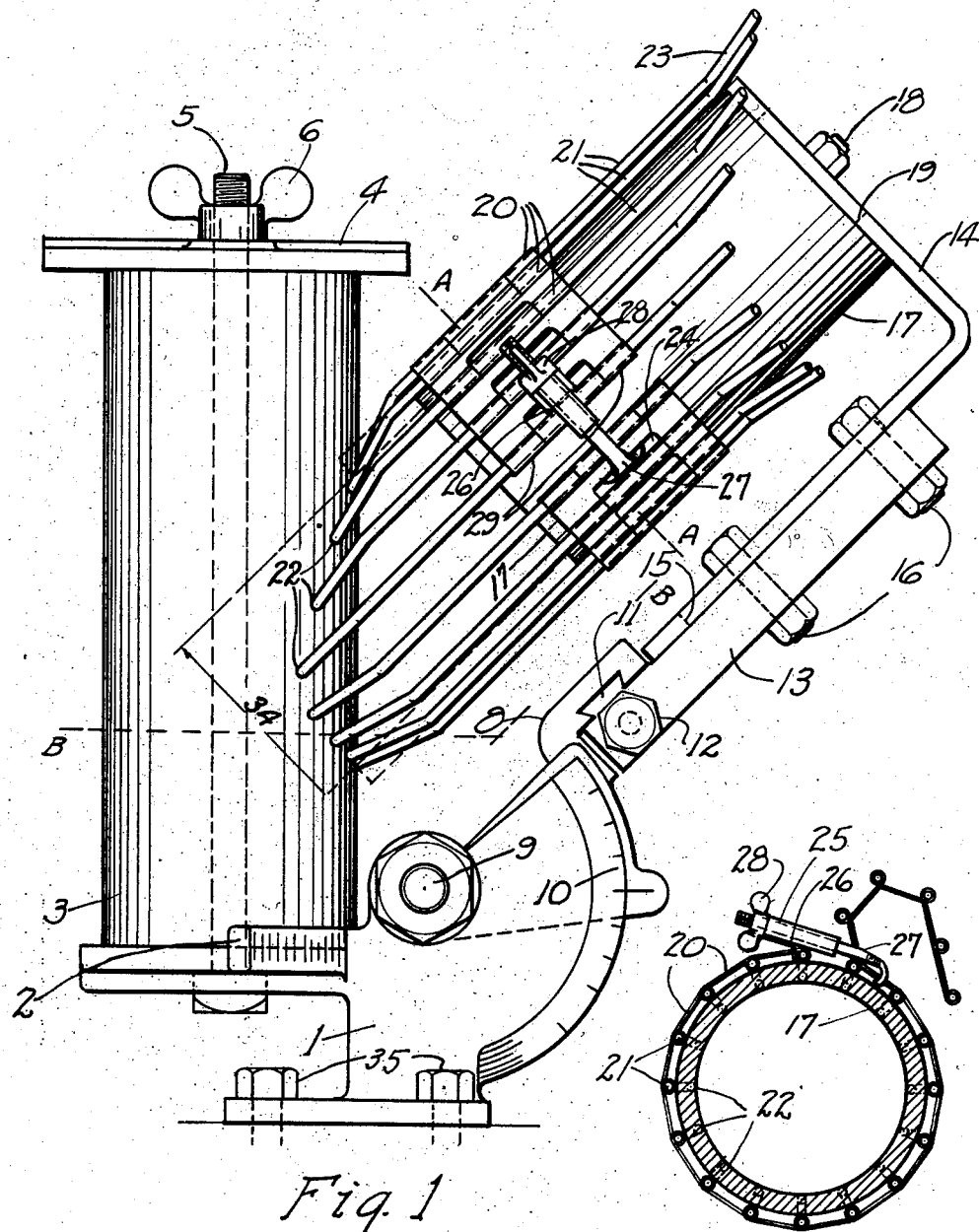

Patented Aug. 7, 1945

2,380,919

UNITED STATES PATENT OFFICE 2,380,919

CONFORMATOR GAUGE FOR TUBULAR JOINTS

George H. Bugenhagen, Midland, Mich.

Application September 9, 1943, Serial No. 501,666

2 Claims. (Cl. 33—175)

The objects of my invention are, 1st. To provide a device for laying out the profile of the cut required at the end of a tubular member in fabricating a welded junction of one tube with another. 2nd. To provide a means for laying out a profile on the inner perimeter of the tube joined to the external perimeter of the tube to which it is being joined, as obviously the necessary trimming of tube end for the weld bead will not disturb the inner profile junction of the members being joined. 3rd. To provide a device for laying out the profile of tubular junctions in welded fabrication of tubular members that may be adapted to a number of pipe sizes and wall thicknesses and a wide range of intersection angles.

I attain these objects in the device shown on the accompanying drawings, in which Fig. 1 is a side view showing the device placed in a recording position. Fig. 2 is a cross section of Fig. 1, on line a a, showing a method of clamping the device in position. Fig. 3 shows the device placed in position for purpose of making a transfer of the record made with the device in the position shown in Fig. 1. Fig. 4 is a plan section on line b b of Fig. 1, showing a means for centering the alignment of the tubing and means of adjustment. Fig. 5 shows the positions of the recording finger ends, in making a profile record and in making the transfer of the record. Fig. 6 shows the use of pointed finger ends for purpose of greater accuracy.

Referring to the drawings, a supporting base 1, having a supporting bed with wing walls 2 for centering, supports a suitable template length of tubing 3, the said template held in place by the cross bar 4 at the top by bolt and wing nut 5 and 6 respectively, the head of bolt 5 seated in a T slot 7 as shown in Fig. 4 to provide means of adjustment in attaching various diameter sizes of pipe templates.

The hinged arm support 8 having an angle degree scale 10, pivots on the bolt 9, is provided with an extended arm 13, the said arm is provided with lateral adjustment by the dove tail slide 11 and adjusting screw 12, operatively held in position by the disc 31 shown in Fig. 4. A suitable template tube support extension 14, also adjustably fixed to the aforesaid extension arm 13 by the bolts 16 extending thru the slot 15, supports a suitable template tube 17, is held in place by the bolt 18.

The profile recording fingers 21 as shown, also serve as hinge pins for the flexible band sections 20, they are held firmly in an operative position by the friction due to the spring tension of the hinge ears 29, the said spring tension friction being of a suitable magnitude to permit axial longitudinal movement of the recording fingers for the purpose heretofore stated.

The recording finger ends 22 and 23 are offset to compensate for the wall thickness of the tubing, see Fig. 5.

A clamp hook 27 engages a suitable opening 24 of the band links 20, the threaded end of the said hook 27 extends thru a tube 25, is provided with a wing nut 28 for adjustment, a catch 26 fixed to the aforesaid tube 25 is seated against the center hinge ear, thus the means of clamping is adaptable to various diameters of tubing, in making a recording or in making a transfer of the record.

In operation, suitable template tubing sections 3 and 17 are adapted to the respective supporting means 1 and 14, with the angle adjustment arm set at the required angle; then the profile finger assembly 20 and 21 is clamped into position, the profile fingers 21 are extended to contact the external surface of the tube template 3, with all finger ends 22 making actual contact, positioned radially as shown in Fig. 2; the assembly is then removed and attached to the tube 17a, Fig. 3, the tube intended to be fabricated; the ends 22 of actual fingers involved turned about 90 degrees from radial alignment in order to lay flat on the tube face of tube 17a, this permits placing the marking 32 of Fig. 3 to be placed on the axis line of each recording finger. After all marks 32 are made the assembly is removed and the markings 32 joined into a profile line 33, whence the profile is complete and ready for cutting. Reference is made to the difference in offsets of the profile finger ends, at opposite ends, this difference will compensate for the difference in wall thicknesses of pipe, as larger pipes have heavier walls than the smaller pipes, thus one end of the device may be used for the thinner walled pipe and the other end for the thicker walled pipe.

To develop a profile on the exterior surface of a tube, the finger ends are laid flat on the surface of the tube when making the record, in the same manner as is used in making the transfer of a record.

In Fig. 6 the profile fingers are shown pointed as at 35, for the purpose of obtaining greater accuracy if required.

Various means may be adopted to retain the relationship of one tube member with another for the purpose of obtaining a profile record. I therefore do not confine the means for this purpose to the specific structure shown, as obviously many recordings may be made with the device direct from the structural members being fabricated into a unit.

I am not aware of my device having been used and claim broadly as follows:

1. In apparatus for laying out a profile for cutting a first elongated hollow member, which is to be joined to a second elongated member to form a non-planar junction, the combination including: a base member; means for supporting rigidly on said base member a first template having a cross-section substantially identical with that of the said second elongated member; an arm hinged to the base member and adapted to swing in the plane of the longitudinal axis of the said supported first template; means to hold rigidly the hinged arm at a predetermined position between the limits of its swing corresponding to the angle at which the elongated members are to be joined; template supporting means for supporting rigidly on the hinged arm a second template having a cross-section substantially identical with that of the said first elongated member; flexible removable encircling means adapted to encircle tightly the second template and to clamp securely thereon; and rod-like members, having ends offset a distance substantially equal to the wall thickness of the member which is to be cut, slidably supported by the encircling means axially parallel to the second template, the ends of the rod-like members when slid into contact with the said first template outlining a profile for cutting the said first elongated member.

2. In apparatus for laying out a profile for cutting a first elongated hollow member which is to be joined to a second elongated member to form a non-planar junction, the combination including: a base member; means for supporting rigidly on said base member a first template having a cross-section substantially identical with that of the said second elongated member; an arm hinged to the base member and adapted to swing in the plane of the longitudinal axis of the said supported first template; means to hold rigidly the hinged arm at a predetermined position between the limits of its swing corresponding to the angle at which the elongated members are to be joined; template supporting means for supporting rigidly on the hinged arm a second template having a cross-section substantially identical with that of the said first elongated member; means integral with said arm to adjust the position of the second template laterally with respect to the longitudinal axis of the first template; flexible removable encircling means adapted to encircle tightly the second template and to clamp securely thereon; and rod-like members, having ends offset a distance substantially equal to the wall thickness of the member which is to be cut, slidably supported by the encircling means axially parallel to the second template, the ends of the rod-like members when slid into contact with the said first template outlining a profile for cutting the said first elongated member.

GEORGE H. BUGENHAGEN.